US005647601A

United States Patent [19]
Potter et al.

[11] Patent Number: 5,647,601
[45] Date of Patent: Jul. 15, 1997

[54] COLLAPSIBLE INFANT STROLLER ADAPTER

[76] Inventors: Michael D. Potter, P.O. Box 174, E. Shore Rd., Grand Isle, Vt. 05458; Cherie B. Mathews, Rte. 5, Box 399 D, Big Pine Key, Fla. 33043

[21] Appl. No.: 383,875

[22] Filed: Feb. 6, 1995

[51] Int. Cl.$^6$ ..................................................... B60F 5/00
[52] U.S. Cl. .................. 280/47.38; 280/642; 280/33.998
[58] Field of Search ............................ 280/30, 31, 47.19, 280/47.35, 47.38, 62, 204, 278, 639, 642, 643, 647, 648, 650, 33.998; 224/409

[56] References Cited

U.S. PATENT DOCUMENTS

| | | | |
|---|---|---|---|
| 279,778 | 6/1883 | Long | 280/30 |
| 1,033,324 | 7/1912 | Judge et al. | 280/648 |
| 2,453,631 | 11/1948 | Leser et al. | 280/47.35 |
| 3,643,292 | 2/1972 | Mayer | 16/144 |
| 3,849,834 | 11/1974 | Mayer | 16/145 |
| 3,879,146 | 4/1975 | Mayer | 403/93 |
| 4,132,429 | 1/1979 | Woods | 280/647 |
| 4,335,900 | 6/1982 | Fleischer | 280/649 |
| 4,606,550 | 8/1986 | Cone | 280/642 |
| 4,856,809 | 8/1989 | Kohus et al. | 280/644 |
| 4,902,027 | 2/1990 | Skelly | 280/33.998 |
| 4,953,880 | 9/1990 | Sudakoff et al. | 280/47.38 |
| 5,176,395 | 1/1993 | Garforth-Bles | 280/415.1 |
| 5,188,389 | 2/1993 | Baechler et al. | 280/650 |
| 5,263,730 | 11/1993 | Roach et al. | 280/47.4 |
| 5,299,825 | 4/1994 | Smith | 280/650 |
| 5,318,318 | 6/1994 | Berner et al. | 280/204 |
| 5,344,171 | 9/1994 | Garforth-Bles | 280/415.1 |
| 5,356,171 | 10/1994 | Schmidlin et al. | 280/650 |
| 5,364,119 | 11/1994 | Leu | 280/650 |
| 5,536,027 | 7/1996 | Gollub | 280/33.998 |

FOREIGN PATENT DOCUMENTS

| | | | |
|---|---|---|---|
| 85549 | 2/1921 | Australia | 280/639 |
| 4135322 | 4/1993 | Germany | 280/62 |
| 753337 | 7/1956 | United Kingdom | 280/47.38 |
| 2244029 | 11/1991 | United Kingdom | 280/647 |

Primary Examiner—Richard M. Camby
Assistant Examiner—Frank Vanaman
Attorney, Agent, or Firm—Theodore R. Touw

[57] ABSTRACT

A collapsible adapter is used to convert an infant stroller for use on irregular terrain or for use while running or jogging. The adapter holds an accommodated stroller on supports, lifting the wheels of the stroller off the terrain and substituting its own wheels for their function. The adapter has a light weight frame which folds at lockable hinges, to make a compact configuration for storage or transportation when the adapter is not in use with a stroller. When unfolded, the frame locks into the unfolded configuration. When in use, the adapter and an accommodated stroller are pushed using the accommodated stroller's existing handle. The adapter's hinges are arranged so that the weight of the adapter and the weight of a stroller with which it is used both act so as to prevent unintended collapse of the adapter. Simple attachment means provide for secure attachment of a stroller to the unfolded adapter. An attachment clamp acts to pull the accommodated stroller in a forward direction into slots or against projections of the adapter's stroller support. When used with a collapsible stroller, the adapter's attachment means act to prevent the stroller from collapsing. A doubly-hinged handle near the center of gravity of the unfolded adapter provides for convenient carrying of the folded adapter. When equipped with a quick-release front wheel, the adapter may itself be adapted for towing behind a bicycle.

9 Claims, 5 Drawing Sheets

COLLAPSIBLE INFANT STROLLER ADAPTER

FIELD OF THE INVENTION

This invention relates generally to adapters to improve mobility or maneuverability of wheeled devices. It relates more particularly to a collapsible adapter to adapt an infant stroller for use on irregular terrain or for use while running or jogging.

BACKGROUND OF THE INVENTION

There are many known infant strollers intended primarily for use on sidewalks or other smooth, firm terrain, which normally have four wheels or sometimes double-wheel casters. Examples are the popular strollers manufactured by Graco Children's Products of Everson, Pa., and the strollers described in U.S. Pat. Nos. 4,606,550 and 4,856,809. In the remainder of this specification, this common type of stroller will be referred to as a "sidewalk stroller." Recently, special-purpose infant strollers have been developed to accommodate users who wish to run or jog while using an infant stroller, or who wish to use a stroller on uneven or softer terrain, such as a hiking trail or sandy beach. These strollers often have three wheels instead of four, and some wheels are often larger than the wheels of sidewalk strollers. Examples of the latter type of stroller are the "Yakima Jogger"™ manufactured by Racing Strollers, Inc. of Yakima, Wash., the jogging strollers disclosed in U.S. Pat. Nos. 4,953,880, 5,263,730, and 5,356,171 and the ornamental designs disclosed in Design U.S. Pat. Nos. D297,525 and D343,812. This type of stroller is referred to here as a "jogging stroller." Both sidewalk strollers and jogging strollers of the related art are often made to be collapsible, for ease in storage and transportation. Structures similar to jogging strollers, but with trailer hitch elements have been used for bicycle trailers, which may be used for carrying seated infants behind a bicycle. U.S. Pat. Nos. 5,301,963 and 5,176,395 disclose convertible strollers which could be converted to trailer configurations. U.S. Pat. No. 4,902,027 discloses an all-terrain dolly for wheeled devices, which could be used with an infant stroller.

PROBLEMS SOLVED BY THE INVENTION

Persons who care for children and who also run or jog for exercise have had limited choices with regard to infant strollers. Heretofore, they have had to choose between their exercise and the use of a stroller for the child, or have had to purchase two types of strollers, the normal sidewalk stroller and the special-purpose jogging stroller. Those who use both types of stroller have had to store and transport both types. This invention allows easy adaptation of the sidewalk stroller for running type of exercise activities or other outdoor activities such as hiking on irregular terrain. Because the adapter of this invention collapses to a compact configuration, it alleviates the space problems for storage and transportation that the use of two separate strollers entails.

OBJECTS AND ADVANTAGES OF THE INVENTION

One object of the invention is an adapter that can adapt a normal "sidewalk" stroller for use on irregular terrain. Another object of the invention is an adapter that can adapt a sidewalk infant stroller for use while running or jogging. A related object is a stroller adapter that allows a runner or jogger to exercise without carrying the additional weight of an infant. Another related object is an adapter that improves the maneuverability of an infant stroller. Another object is an adapter that can be collapsed to a compact configuration when not in use with a stroller. Another object of the invention is a collapsible stroller adapter with improved safety. A related object is a collapsible adapter that will not collapse spontaneously when in use with a stroller. Another related object is an adapter whose own weight, with or without the weight of a carried stroller, acts in a direction so as to prevent collapse. From another point of view, an object of the invention is an adapter which is relatively light in weight, and does not add more weight than necessary to the weight of a stroller. Another object is an adapter that can be conveniently carried with one hand when collapsed. A related object is an adapter with a handle for convenient carrying. Another object is an adapter that can hold a stroller firmly and safely when in use. A particular object is an adapter which can prevent a collapsible stroller from undergoing partial or full collapse while the stroller is in use with the adapter. Yet another object is a stroller adapter which can be used with many different types and sizes of strollers, including those intended for carrying more than one child. Another object is an adapter that can itself be adapted, to convert to a bicycle trailer adapter for a sidewalk stroller. Other objects and advantages will become apparent from a reading of the detailed description of the preferred embodiments and from the accompanying drawings.

SUMMARY OF THE INVENTION

This invention is a collapsible adapter which converts an infant stroller for use on irregular terrain or for use while running or jogging. The adapter holds an accommodated stroller on supports, lifting the wheels of the stroller off the terrain and substituting its own wheels for their function. The adapter has a light weight frame which folds at lockable hinges, to make a compact configuration for storage or transportation when the adapter is not in use with a stroller. When unfolded, the frame locks into the unfolded configuration. When in use, the adapter and an accommodated stroller are pushed using the accommodated stroller's existing handle. The adapter's hinges are arranged so that the weight of the adapter and the weight of a stroller with which it is used both act so as to prevent unintended collapse of the adapter. Simple attachment means provide for secure attachment of a stroller to the unfolded adapter. An attachment clamp acts to pull the accommodated stroller in a forward direction into slots or against projections of the adapter's stroller support. When used with a collapsible stroller, the adapter's attachment means act to prevent the stroller from collapsing. A doubly-hinged handle near the center of gravity of the unfolded adapter provides for convenient carrying of the folded adapter. When equipped with a quick-release front wheel, the adapter may itself be adapted for towing behind a bicycle.

DETAILED DESCRIPTION OF THE PREFERRED EMBODIMENTS

Figure 1:
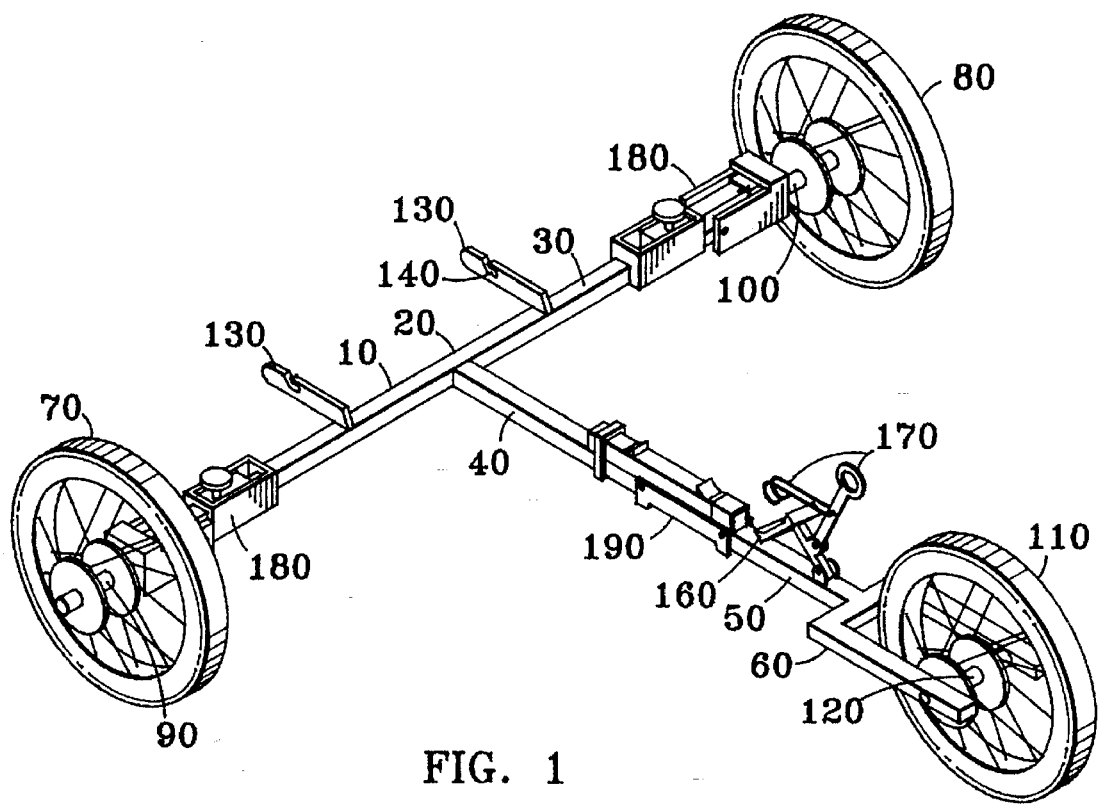
FIG. 1 shows a perspective view of one embodiment of a stroller adapter made according to the invention.

FIG. 1 shows a perspective view of one embodiment of a stroller adapter 10 made according to the invention. FIG. 1 should be viewed in conjunction with FIG. 3, which shows stroller adapter 10 in use with a stroller. Adapter 10 has a foldable frame 20, comprising a lateral member 30, a rear longitudinal member 40, and a front longitudinal member 50. The longitudinal direction here is the direction that the adapter would roll on its wheels when in use. In the preferred configuration of FIG. 1, a front wheel fork 60 is attached to the front end of front longitudinal member 50. Rear wheels 70 and 80 have rear wheel axles 90 and 100 at the ends of lateral member 30. Front wheel 110 has a front wheel axle 120 mounted in front wheel fork 60. Wheels 70, 80 and 110 preferably have diameters (for example 40 cm. diameters) larger than the wheels of a stroller 65 to be accommodated, and preferably have wider tread than wheels of stroller 65. A minimum diameter of wheels 70 and 80 is that diameter which holds the rear wheels of the adapted stroller above the ground when the stroller is held on support elements 130.

Figure 3:
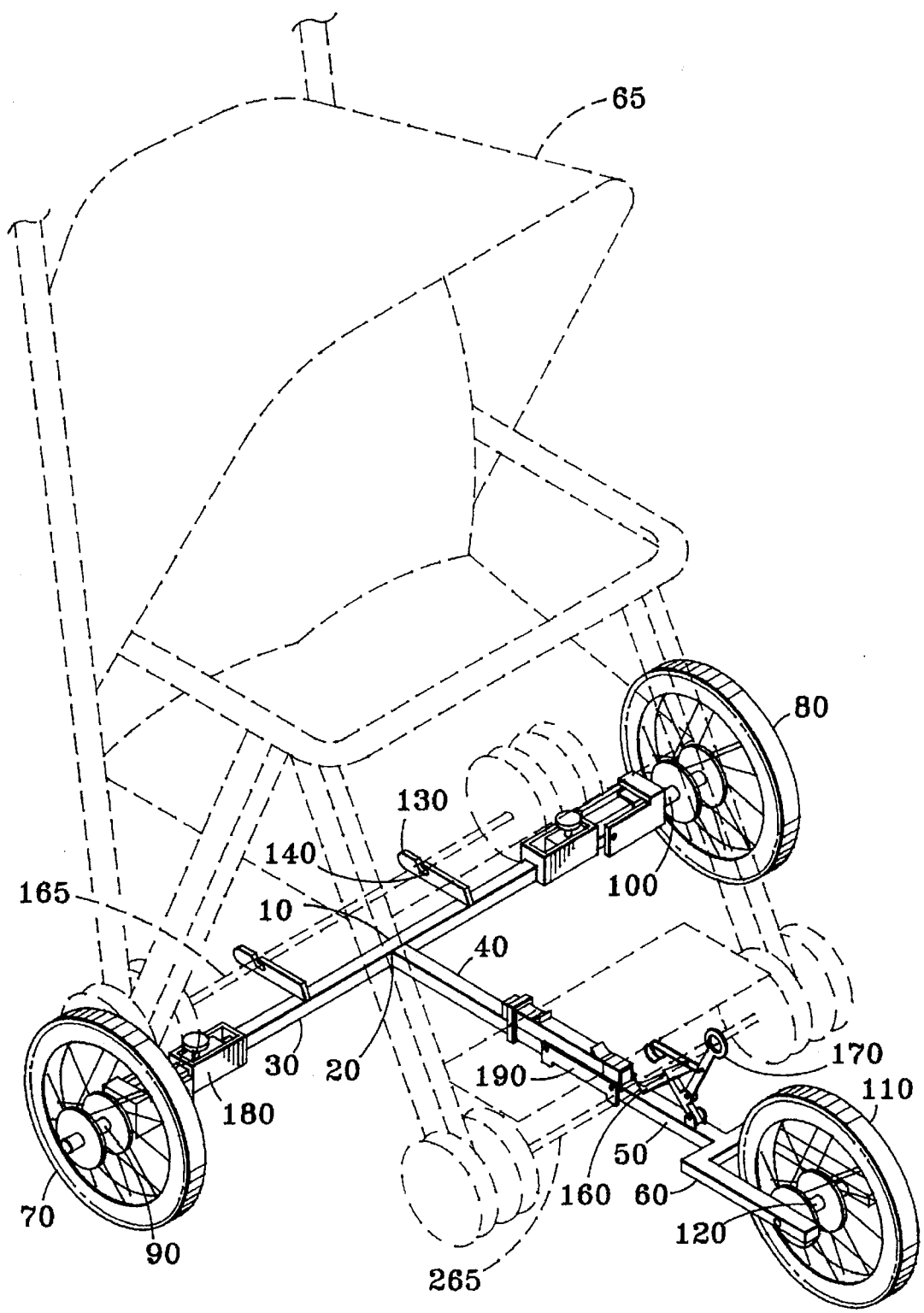
FIG. 3 shows a perspective schematic view of the embodiment of FIG. 1 in use with a stroller.

Support elements 130 on foldable frame 20 serve to hold the rear axle 165 (or other suitable structural element) of the adapted stroller 65 (Cf. FIG. 3). While support elements 130 are shown attached to lateral element 30, and extending longitudinally rearward, they could instead extend forward or could be attached to both lateral element 30 and longitudinal element 40, extending between them at an angle to the forward longitudinal direction, thus forming a triangulated truss. The arrangement shown in FIG. 1, with supports 130 extending rearward, is preferred for improved leverage when raising the adapter's front wheel off the terrain. Support elements 130 have slots 140 suitably shaped and oriented to hold the axle securely while the stroller is pushed ahead by the jogger. Supports 130 hold the existing normal wheels of the adapted stroller 65 off the ground. Only the three wheels 70, 80, and 110 of the adapter contact the ground during use. There are lockable hinges 180 inboard of the two rear wheels 70 and 80 of the adapter. Lockable hinges 180 allow rear wheels 70 and 80 to be folded under frame 20 when it is collapsed for storage or transportation. But when they are unfolded for use of the adapter, lockable hinges 180 are locked to prevent adapter 10 from collapsing accidentally. The two longitudinal members 40 and 50 of frame 20 are each connected by hinges to a doubly hinging handle 190. This handle 190 preferably has two lockable hinges at which frame 20 of the adapter may be folded, as described hereinafter in more detail. A clamp 170 engages a suitable frame element 265 or a front axle of the adapted stroller 65, applying a force in the direction toward front wheel 110 of adapter 10 (as described in more detail hereinafter).

Figure 2A:
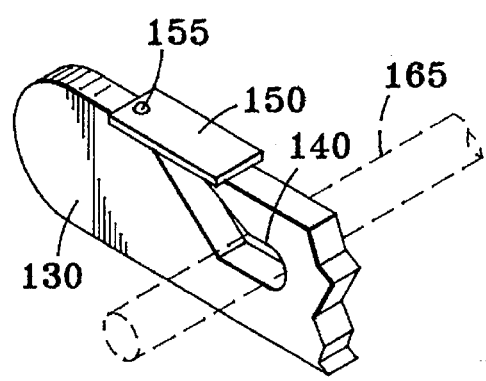
FIGS. 2A and 2B show perspective views of alternative embodiments of a detail of the stroller adapter.
Figure 2B:
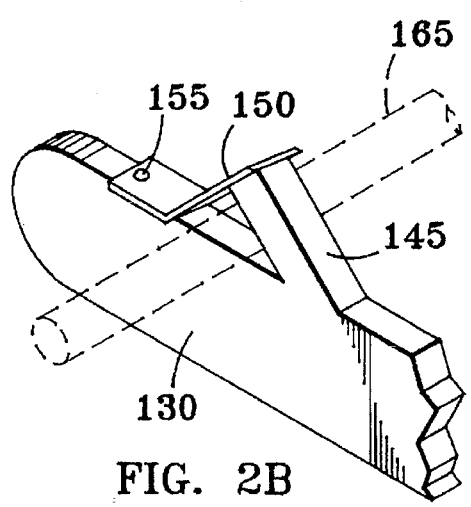

FIG. 2A shows a perspective view of a detail of the embodiment of FIG. 1. FIG. 2B shows an alternate embodiment. In FIG. 2A, the rear axle 165, or other suitable member of the stroller 65 to be adapted, is held in a suitably shaped slot 140 in support 130 by retaining elements 150, which may be mounted to swivel about an axis 155 attached to support 130. In FIG. 2B, projections 145 on support 130 substitute for slots 140 and hold rear axle 165 or other suitable member of the stroller to be adapted. Again a retaining element 150 may be mounted to swivel about axis 155. A notable feature of the embodiments illustrated in FIGS. 2A and 2B is that the adapted stroller is held firmly toward the front end of the adapter due to the force exerted by the user when pushing the adapted stroller 65 forward. In addition to this feature, positive stops such as retaining element 150 may be used to prevent the adapted stroller from moving upward and rearward, as such motions would otherwise tend to disengage the stroller from the adapter. However the invention works well without retaining element 150 and axis 155; they may be omitted for simplicity and lower cost. A preferred embodiment has slots 140 shaped substantially as shown in FIG. 2A, without retaining element 150 and axis 155. In referring again to FIG. 3, another notable feature of the embodiments illustrated is that clamp 170 acts in a direction (forward toward front wheel 110) to pull axle 165 into slots 140 or against projections 145 or equivalent structures when clamp 170 is engaged. While FIGS. 1 and 3 show two supports 130, with one slot 140 each, it should be noted that there may be only one support 130 or more than two supports 130, and that there may also be a multiplicity of slots 140 (and/or projections 145), arranged in spaced relationships to allow the adapter to accommodate a variety of sizes and types of strollers 65.

FIG. 3 shows schematically a perspective view of the embodiment of FIG. 1 in use with a stroller 65. Supports 130 on frame 20 hold rear axle 165 of the normal stroller 65. As mentioned above, a retaining element 150 (shown in FIGS. 2A and 2B) may be used to secure the stroller's existing axle 165 into slots 140 or against projections 145. Clamp 170, at its rearward-facing end, engages a suitable structural member 265 near the bottom front of the stroller 65 to be accommodated, and holds it against a cradle 160. The respective heights of supports 130 and cradle 160 above the terrain are arranged so that the stroller 65 is kept horizontal when installed on the adapter, i.e. kept in its normal attitude, not pitched forward or backward.

Figure 4:
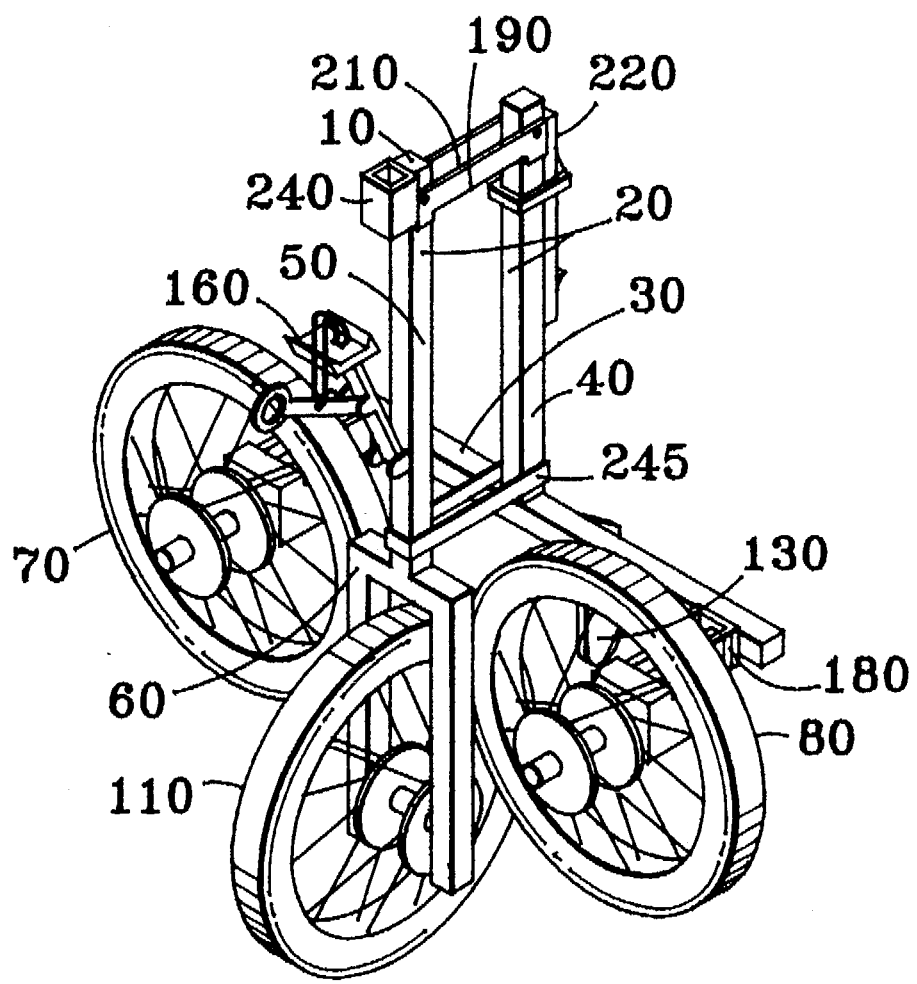
FIG. 4 shows a perspective view of a stroller adapter in a collapsed configuration.

FIG. 4 shows a perspective view of the stroller adapter in a collapsed configuration. When lockable hinges 180 are unlocked, rear wheels 70 and 80 can fold over through an angle of about 90° to become more or less parallel to frame 20 for more compact storage and transportation. Suitable combinations of rear wheel 70 and 80 diameters with dimensions of frame elements and with hinge locations provide for the rear wheels to touch or almost touch when frame 20 is folded, as illustrated in FIG. 4. Similarly (by suitable combinations of frame element dimensions) front wheel 110 may be made to engage with both rear wheels when frame 20 is fully folded, such that (with suitably resilient tires), the wheels' tires lock together to retain the adapter in its collapsed configuration while subject to normal handling. Each lockable hinge 180 operates about an axis that is substantially parallel to the terrain and operates through an angle bounded by folded and unfolded positions such that the weight of adapter 10 tends to hold each lockable hinge 180 in its unfolded position. The same is true of lockable hinges associated with doubly hinging handle 190 (shown in FIG. 5 and described in more detail hereinafter). Thus, even if the locking mechanisms of all lockable hinges were to fail during use, the adapter would not collapse accidentally. The lengths of frame elements, particularly frame elements 40 and 50, are chosen so as to locate handle 190 as close as possible to the center of gravity of the unfolded adapter, so that the adapter after folding into its collapsed configuration will be balanced and have its new center of gravity below handle 190 while being carried. For the same reason, the adapter is preferably made bilaterally symmetric. Any of several conventional fastening mechanisms may optionally be used to secure the adapter in its collapsed configuration. A strap 245 is shown in FIG. 4 to perform this function. It may be secured with a buckle, hook-and-loop fasteners, buttons, snap fasteners, etc. Strap 245 may be an elastic cord, such as the type called "bungie cord," secured with hooks at its two ends.

Figure 5:
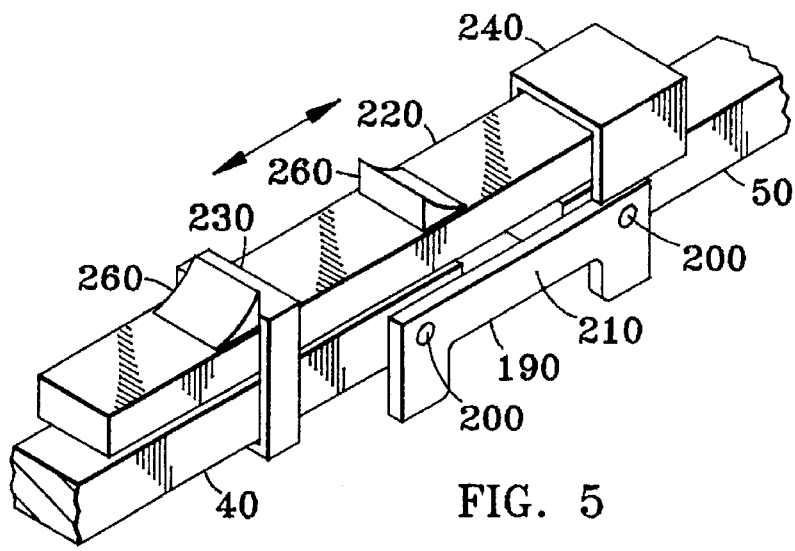
FIG. 5 shows a perspective view of an embodiment of a handle and lockable hinges of a stroller adapter.

FIG. 5 shows a perspective view of a particularly simple embodiment of a lockable doubly-hinging handle 190 of the stroller adapter. FIG. 5 illustrates a way that hinging action about hinge pins 200 of handle 190 may be prevented (i.e. locked) when the adapter is in use with a stroller. A rigid bar 220 can slide parallel to longitudinal frame members 40 and 50 within an annular retainer 230 fixed to frame member 40 to engage with a pocket in piece 240 fixed to frame member 50, to lock the hinges. Stops 260 limit the travel of bar 220 and prevent its loss. When bar 220 is engaged as shown in FIG. 5, it connects longitudinal frame members 40 and 50 to prevent hinging about axes through hinge pins 200. When bar 220 is withdrawn from piece 240, the hinges are released, allowing hinging as shown in FIG. 4. A conventional detent such as a ball and spring detent may be used to hold bar 220 temporarily in its locked position. When lockable hinges of handle 190 are released from their locked condition, frame 20 may be folded at axes through hinge pins 200. These axes are substantially parallel to the terrain when the adapter is in use. Each lockable hinge operates through an angle bounded by folded and unfolded positions such that the weight of adapter 10 tends to hold each lockable hinge in its unfolded position. Lockable hinges 180 (shown in FIGS. 1, 3, 4, and 7) may operate in a manner similarly to the hinges 200 of handle 190. Other types of lockable hinge mechanism may be adapted for use as hinges 180 and 200. The lockable hinge joints of U.S. Pat. Nos. 3,643,292, 3,849,834, or 3,879,146, for example, could be adapted for this purpose. To preserve the safety features of the invention, lockable hinges 180 or 200 should be designed to limit opening of the hinges to unfolded-position angles no greater than about 180 degrees at each joint. A particular embodiment of lockable hinges 180 that achieves this limitation is described hereinafter with reference to FIG. 7.

Figure 6:
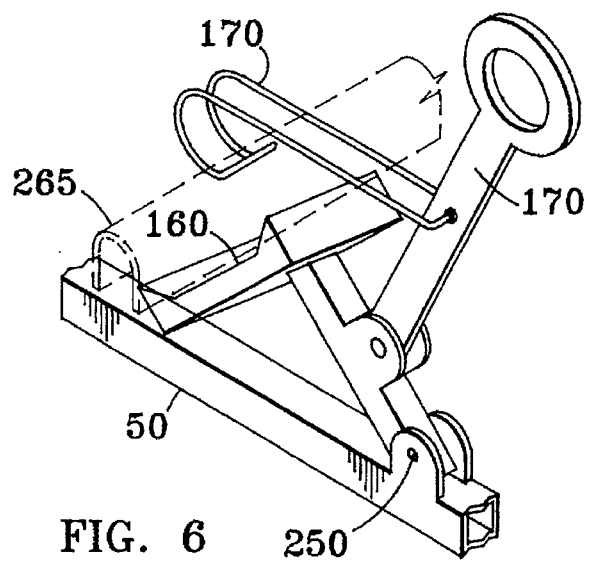
FIG. 6 shows an embodiment of a clamp of a stroller adapter.

FIG. 6 shows an embodiment of a clamp 170 of a stroller adapter. The clamp 170 shown in FIG. 6 is of a conventional type such as those often used to latch toolbox lids and the like. Other equivalent clamping means can of course be used. Clamp 170, at its rearward-facing end, engages a suitable structural member near the bottom front of the stroller to be adapted, and holds it against a cradle 160. Clamp 170 may, for example, hook over a front axle or a lateral strut as shown in FIG. 6. The single hook of the embodiment shown of clamp 170 may be replaced instead with a hook element having a plurality of spaced apart hook structures, such as hook-shaped slots in an elongated bar, to accommodate a larger variety of types and sizes of strollers. Clamp 170, at its forward-facing end, is fastened to (or made integral with) front longitudinal frame member 50. Thus when clamp 170 is tightened, it tends to pull the adapted stroller forward against the stops provided by slots 140 and/or projections 145. Clamp 170 may be fastened pivotally to longitudinal frame member 50 at a pivot axis 250 to provide a variable angle and to some extent variable height of cradle 160 for adapting to various positions of elements of an adapted stroller 65. Clamp 170 may also be adjustable in length, as for example with a threaded rod (not shown), thus allowing further adjustability of cradle 160.

Figure 7:
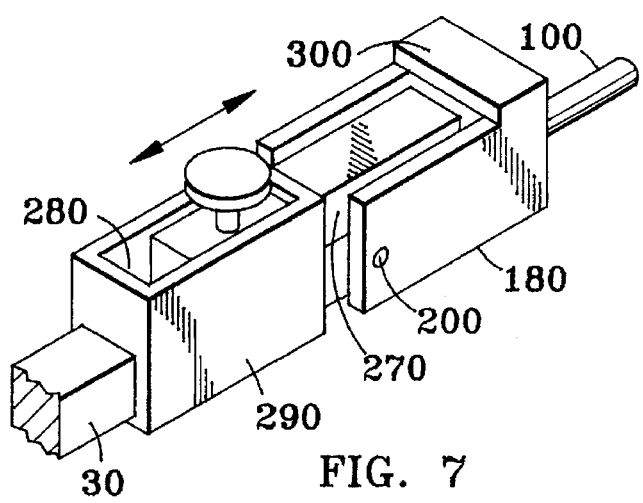
FIG. 7 shows an embodiment of a lockable hinge of a stroller adapter.

FIG. 7 shows an embodiment of a lockable hinge 180, by which rear wheel axles 90 and 100 of a stroller adapter may be hinged. In FIG. 7, hinge 180 has a hinge pin 200 passing through a rigid extension of lateral frame member 30. Hinge pin 200 is fastened at its ends with a U-shaped or rectangular piece 300 having a pocket into which a bar 270 slides when lockable hinge 180 is locked. Bar 270 may have a tapered end to provide for snapping into engagement. A slotted chamber 290 contains a spring which pushes bar 270 into engagement with the pocket in piece 300. A handle attached to bar 270 and extending through the slot provides for moving bar 270 against spring pressure thus withdrawing it from piece 300 and releasing lockable hinge 180 from a locked condition.

In another embodiment (not shown in the drawings), frame lateral element 30 may be made in the form of a pantograph with lockable hinges 180. The pantograph has four sides or arms: two arms normally horizontal when stroller adapter 10 is in use, and two arms normally vertical when the stroller adapter 10 is in use. The four arms preferably lie in a vertical plane extending laterally across the stroller adapter. One of the four arms of the pantograph (preferably one of the two normally horizontal arms) carries supports 130. Two of the four arms (preferably two normally vertical arms) carry rear wheel axles 90 and 100.

Figure 8:
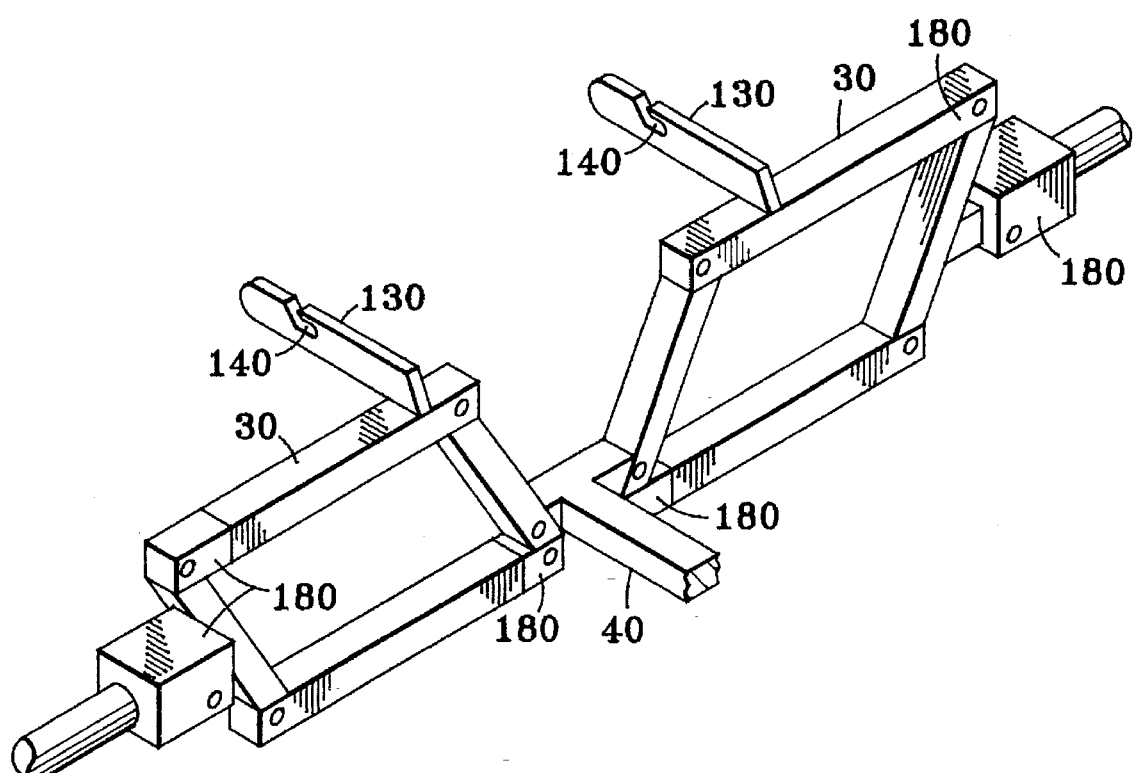
FIG. 8 shows frame elements used for another embodiment of the stroller adapter.

Another related and more preferred embodiment (shown in FIG. 8) has frame lateral element 30 comprising two similar pantograph structures, one for each of the rear wheels 70 and 90. In this embodiment, each of the two similar pantographs carries one support element 130 on one of its normally horizontal arms. Another of the four arms (preferably one of the two normally vertical arms) of each pantograph structure is fixed to rear longitudinal element 40. The opposite normally vertical arm carries a rear wheel axle 90 or 100. In both of the pantograph-type embodiments described herein, there may be lockable hinges 180 in addition to those shown in the drawings. Each pantograph structure has four hinges, one at each of its four corners. At least one hinge of the four must be a lockable hinge 180. Preferably two or more of the four hinges of each pantograph structure are lockable hinges. The pantograph is made so as to fold downward toward the terrain when the stroller adapter frame is collapsed, as in the other embodiments described herein. Each pantograph is preferably made to fold flat when collapsed, in a manner know in related mechanical arts.

The stroller adapter 10 may be made by a number of conventional fabrication methods for such products, known to those skilled in the art. For example frame 20 may be fabricated by welding suitable steel stock, or by combining extruded aluminum parts with suitable fastening means.

The invention will be further clarified by considering the following examples of the use of the invention, which are intended to be purely exemplary.

To use the stroller adapter, it is first unfolded from its collapsed configuration if necessary. The stroller to be adapted is lifted onto the adapter, with its rear axle 165 or other suitable structural member situated on supports 130 and inserted into slots 140 and/or placed behind projections 145. Only the three wheels of the adapter contact the ground during use; the existing wheels of the adapted stroller itself are held above the terrain by the adapter. A front axle or other suitable structural member 265 near the bottom front of the adapted stroller is placed on cradle 160. Clamp 170 is engaged with member or axle 265 and is tightened to pull axle 165 firmly into slots 140 or firmly against projections 145. The user pushes the adapted stroller while running, jogging, or hiking on irregular terrain, using the normal existing stroller handle. After use, clamp 170 may be disengaged to release the stroller for removal by reversing the installation procedure. The stroller adapter may be collapsed for transportation or storage by unlocking lockable hinges 180 and handle 190 and folding the frame.

From the foregoing description, one skilled in the art can easily ascertain the basic characteristics of this invention, and without departing from the spirit and scope thereof, can make various changes and modifications of the invention to adapt it to various uses and conditions. For example the stroller adapter may be equipped with various combinations of a brake, a quick-release front wheel, fenders, lights, reflectors, a flag, shock absorbers, suspension springs, and/ or a removable handle for use with a removable cargo carrier mounted in place of the stroller. The lateral frame member may be equipped with additional hinges for even more compact collapsed configurations. Such additional hinges may be asymmetrically disposed about the medial axis of the adapter to provide for overlap of the rear wheels in the collapsed configuration. The front wheel or fork may be swivel mounted for more compact storage, with a suitable locking mechanism operating when the adapter is in use. A bicycle towing attachment may be substituted for the front wheel and may be used with a cargo carrier mentioned above. It is intended that the specification and examples be considered as exemplary only, with the true scope and spirit of the invention being defined by the following claims.

Having described our invention, we claim:

1. A collapsible adapter apparatus for supporting and holding an infant stroller having stroller wheels and for conveying the infant stroller over a ground surface, said adapter apparatus comprising:
   a) a frame comprising first, second, and third frame members and a handle, said first frame member being hingedly connected to said handle by a first lockable hinge, said handle being hingedly connected to said second frame member by a second lockable hinge, and said second and third frame members being fixedly interconnected,
   b) a first wheel on a first axle rotatably supported by said first frame member,
   c) second and third wheels on second and third axles respectively, said second and third axles being hingedly connected to said third frame member by third and fourth lockable hinges respectively,
   d) support means connected to said frame for supporting said stroller with said stroller wheels above the ground surface,
   said support means having forward and rearward ends, and said support means further comprising
   means for limiting motion of said stroller toward said forward end of said support means, and
   e) clamping means disposed upon said frame to engage and hold said stroller, said clamping means acting in a direction to pull said stroller toward said forward end of said support means.

2. A collapsible infant stroller adapter apparatus as in claim 1, wherein said support means comprises at least one support member having at least one slot for engaging said stroller and for limiting motion of said stroller toward said forward end of said support means.

3. An apparatus as in claim 2, wherein said support means comprise a pair of said at least one support members, and their respective said slots are oriented parallel to each other.

4. An apparatus as in claim 3, wherein said support means comprises a pair of said at least one support members, and each of said support members has a multiplicity of slots in spaced apart relationship.

5. A collapsible infant stroller adapter apparatus as in claim 1, wherein said support means comprises at least one support member having a projection for engaging said stroller and for limiting motion of said stroller toward said forward end of said support means.

6. An apparatus as in claim 5, wherein said support means comprise a pair of said at least one support members, and their respective said projections are oriented parallel to each other.

7. An apparatus as in claim 6, wherein said support means comprise a pair of said at least one support members, and said support members each have a multiplicity of projections in spaced apart relationship.

8. A collapsible infant stroller adapter apparatus as in claim 1, wherein each of said first, second, third, and fourth lockable hinges operates about an axis that is substantially parallel to the ground surface and operates through an angle bounded by folded and unfolded positions such that the weight of said adapter acts in a direction to hold each of said first, second, third, and fourth lockable hinges in its unfolded position, and wherein said apparatus further comprises means for limiting said angle to be less than or equal to 180 degrees in said unfolded position.

9. A collapsible adapter apparatus for supporting and holding an infant stroller having stroller wheels and a lateral stroller member, and for conveying the infant stroller over a ground surface, said adapter apparatus comprising:
   a) a frame further comprising first, second, and third frame members and a handle, said first frame member being hingedly connected to said handle by a first lockable hinge, said handle being hingedly connected to said second frame member by a second lockable hinge, and said second and third frame members being fixedly interconnected,
   b) a first wheel on a first axle rotatably supported by said first frame member,
   c) second and third wheels on second and third axles respectively, said second and third axles being hingedly connected to said third frame member by third and fourth lockable hinges respectively,
   d) at least one support member connected to said frame and having a top and a forward end, said at least one support member having at least one slot extending downward from said top and toward said forward end of said support member, disposed to engage said lateral stroller member and to support said stroller wheels above the ground surface, and
   e) a clamp comprising a lever member pivotally attached to said frame and a hook member pivotally attached to said lever member, and disposed to engage said stroller and to pull said lateral stroller member into said at least one slot and toward said forward end of said at least one support member,
   wherein each of said first, second, third, and fourth lockable hinges operates about an axis that is parallel to the ground surface and operates through an angle bounded by folded and unfolded positions such that the weight of said adapter acts in a direction to hold each of said first, second, third, and fourth lockable hinges in its unfolded position.

* * * * *